United States Patent
Phan et al.

(10) Patent No.: US 10,628,281 B2
(45) Date of Patent: Apr. 21, 2020

(54) CONCURRENCY VULNERABILITY DETECTION

(71) Applicant: FUJITSU LIMITED, Kawasaki-shi, Kanagawa (JP)

(72) Inventors: Quoc-Sang Phan, Mountain View, CA (US); Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 15/988,934

(22) Filed: May 24, 2018

(65) Prior Publication Data

US 2019/0361789 A1 Nov. 28, 2019

(51) Int. Cl.
*G06F 9/44* (2018.01)
*G06F 11/36* (2006.01)
*G06F 21/57* (2013.01)

(52) U.S. Cl.
CPC ...... *G06F 11/3608* (2013.01); *G06F 11/3612* (2013.01); *G06F 11/3676* (2013.01); *G06F 11/3684* (2013.01); *G06F 11/3688* (2013.01); *G06F 21/577* (2013.01); *G06F 2221/033* (2013.01)

(58) Field of Classification Search
CPC ............. G06F 9/44589; G06F 11/3688; G06F 11/3684; G06F 11/3604; G06F 11/3608
USPC ........................................................ 717/126
See application file for complete search history.

(56) References Cited

U.S. PATENT DOCUMENTS 6,615,166 B1 * 9/2003 Guheen .................. G06Q 10/06
703/27
7,095,416 B1 * 8/2006 Johns ...................... A63F 13/10
345/522

FOREIGN PATENT DOCUMENTS

WO 2014/124691 A1 8/2014

OTHER PUBLICATIONS

Yang et al. "Concurrency Attacks" HotPar, Jun. 7, 2012.
Chang-Seo Park and Koushik Sen, "Randomized active atomicity violation detection in concurrent programs" FSE-16, Nov. 9, 2008.
Koushik Sen, "Race directed random testing of concurrent programs" Programming Language Design and Implementation, pp. 11-21, Jun. 7, 2008.
Joshi et al. "A randomized dynamic program analysis technique for detecting real deadlocks" ACM SIGPLAN Notices 44(6):110-120, PLDI, May 2009.

(Continued)

*Primary Examiner* — Chuck O Kendall
(74) *Attorney, Agent, or Firm* — Maschoff Brennan (57) ABSTRACT

A method of detecting concurrency vulnerabilities is provided. A method may include instrumenting read and write access for a program to a shared memory. The method may also include identifying, via a greybox fuzzer, a test case for the program. Further, the method may include analyzing, via the greybox fuzzer and based on the test case, two or more branches of the program that include sets of racing pairs to determine if the test case is a priority test case. In response to the test case being a priority test case, the method may include providing the test case from the greybox fuzzer to a concurrency verification module. The method may also include testing, via the concurrency verification module, the test case with one or more scheduling policies to identify one or more concurrency vulnerabilities.

20 Claims, 6 Drawing Sheets

(56) References Cited

OTHER PUBLICATIONS

Kim et al. "Precise data race detection in a relaxed memory model using heuristic-based model checking" Automated Software Engineering, Nov. 16, 2009.

Štill et al. "Weak Memory Models as LLVM-to-LLVM Transformations" In: Kofroň J., Vojnar T. (eds) Mathematical and Engineering Methods in Computer Science. Memics, vol. 9548., pp. 144-155, Oct. 23, 2015.

Marcel Bohme et al., Coverage-based Greybox Fuzzing as Markov Chain, Computer and Communications Security, Oct. 24, 2016, pp. 1032-1043.

European Search Report issued in corresponding application No. EP 18202921, dated Jan. 7, 2019.

* cited by examiner

```
x = 0;
Location A
=======================
Thread1 {
    x = 1;
    Location B
}
=======================
Thread2 {
    If ( y > 15 ) {
        f1 ( );
        f2 ( );
        f3 ( );
        If ( x != 1 ) {
            Location C
            abort ( );
        }
        Location D
    } else If ( y > 5 ) {      Reached By y = 18
        Location E
        y++;                    Reached By y = 7
    }
    Location F                  Reached By y = 3
}
```

CONCURRENCY VULNERABILITY DETECTION

FIELD

The embodiments discussed herein relate to detecting concurrency vulnerabilities.

BACKGROUND

A concurrency vulnerability may occur in a concurrent program where two or more threads are run concurrently. A concurrency vulnerability, which may be caused by, for example, a data race (e.g., during execution of a multi-threaded process), may enable a local user to gain root access or execute arbitrary code within ring 0 or cause kernel memory corruption.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include instrumenting read and write access of a program to a shared memory. The method may also include identifying, via a greybox fuzzer, a test case for the program. Further, the method may include analyzing, via the greybox fuzzer and based on the test case, two or more branches of the program that include sets of racing pairs to determine if the test case is a priority test case. In response to the test case being a priority test case, the method may include providing the test case from the greybox fuzzer to a concurrency verification module. The method may also include testing, via the concurrency verification module, the test case with one or more scheduling policies to identify one or more concurrency vulnerabilities.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments discussed herein relate to discovering concurrency bugs. For example, some embodiments may relate to testing program binaries to discover bugs (e.g., bugs that may be exploited by hackers and/or criminals).

Concurrency bugs are notoriously hard to discover and reproduce, since their occurrences depend on, for example, a scheduling policy of an operating system and an external environment. More specifically, because an order of execution of a program may vary based on a scheduling policy, detection or reproduction of a vulnerability may be difficult.

"Fuzzing" or "fuzz testing" may refer to an automated software testing process including providing invalid, unexpected, or random data as inputs to a computer program. Coverage-based Greybox Fuzzing (CGF) is a random testing approach that may not require program analysis. Coverage-guided greybox fuzzing is a well-known technique for discovering bugs. However, the impact of coverage-guided greybox fuzzing on concurrency bugs is very limited. In greybox fuzzing, a program may be executed with an input and coverage may be observed. Yet, some bugs may not be detected during testing, or may only occur after numerous (e.g., 1000) executions with the same input. Further, model checking and active testing may discover concurrency bugs with a given input, although determining the input may be challenging.

Various embodiments may relate methods for improving the effectiveness of fuzzing on discovering concurrency bugs. Thus, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure will be explained with reference to the accompanying drawings.

Figure 1:
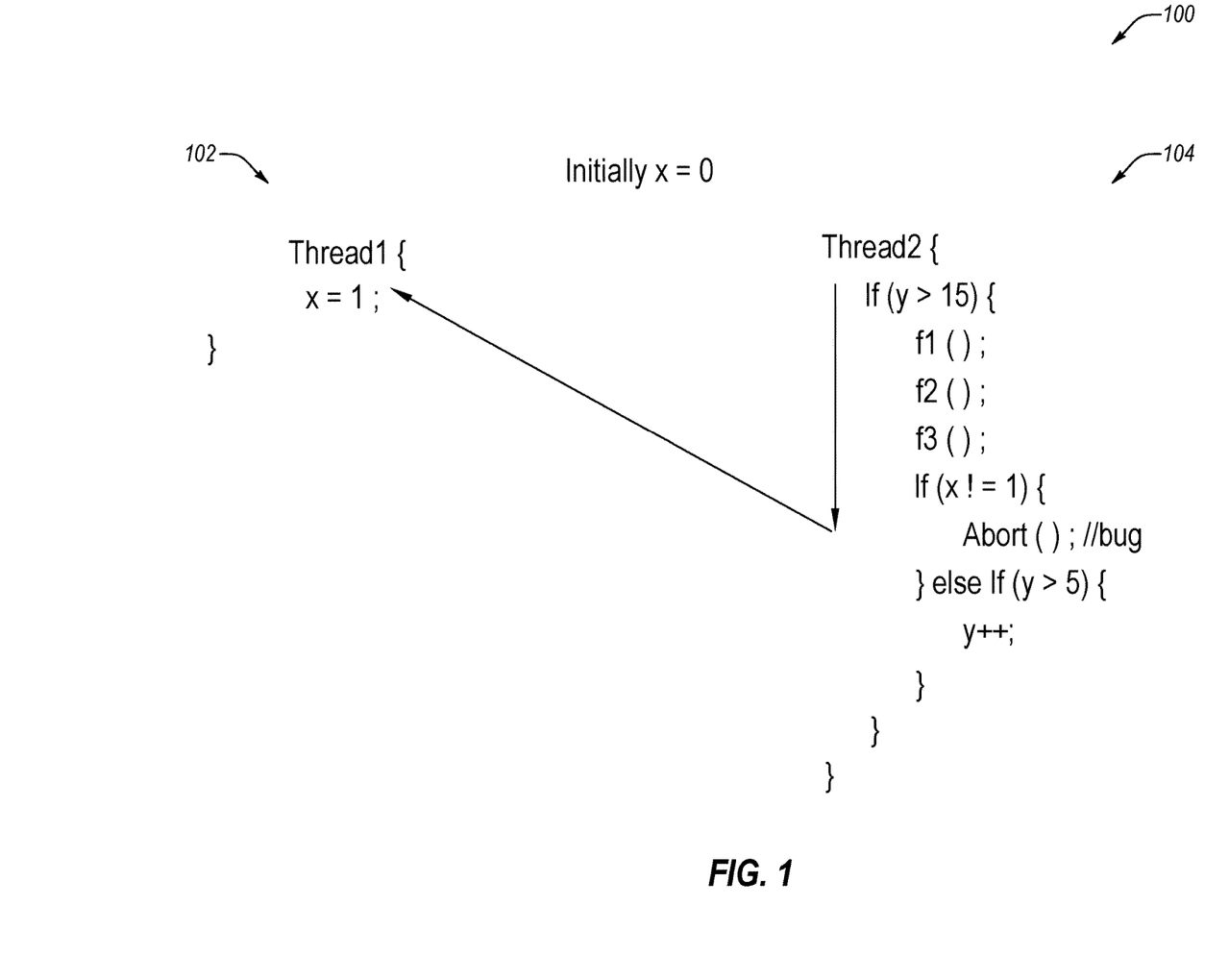
FIG. 1 illustrates source code including a plurality of threads of an example program.

FIG. 1 illustrates source code 100 including two threads, thread 102 ("thread1") and thread 104 ("thread2") of an example program. For example, greybox fuzzing may generate inputs that exercise both paths (e.g., y>15 and y<=15), however running the program many times (e.g., 1000 times) with, for example, y=18 may not discover the bug. Rather, the bug may only occur when a scheduler executes all the instructions in thread 104 before executing the instructions in thread 102 (therefore x=0, thus the abort( ) function may be called). Further, model checking and/or active testing may only discover the bug when y is a specific value (e.g., y=18).

A thread may include stream of operations. For example, an operating system may execute instructions one by one from start to end. A sequential program is often referred to as a single-threaded program as there is only one thread. In a single thread, there are often many branches of execution. For example, if a program includes a condition x>0, there are two branches: x>0 (when the condition is true, often called "then" branch), and x<=0 ("else" branch—the name came from "if . . . then . . . else . . . "). Depending on inputs (e.g., x=1 or x=−1), a stream of operation may follow the "then" branch or the "else" branch.

With weak memory models (WMM) (e.g. used in C and Java), to optimize instruction cycles (and hence performance), instructions may not be executed in their original order in the program. Further, via active testing, a policy for interleaving instructions of the scheduler may be controlled to discover concurrency bug. Moreover, via model checking, all races under WMM may be detected (e.g., via summary function).

Figure 2:
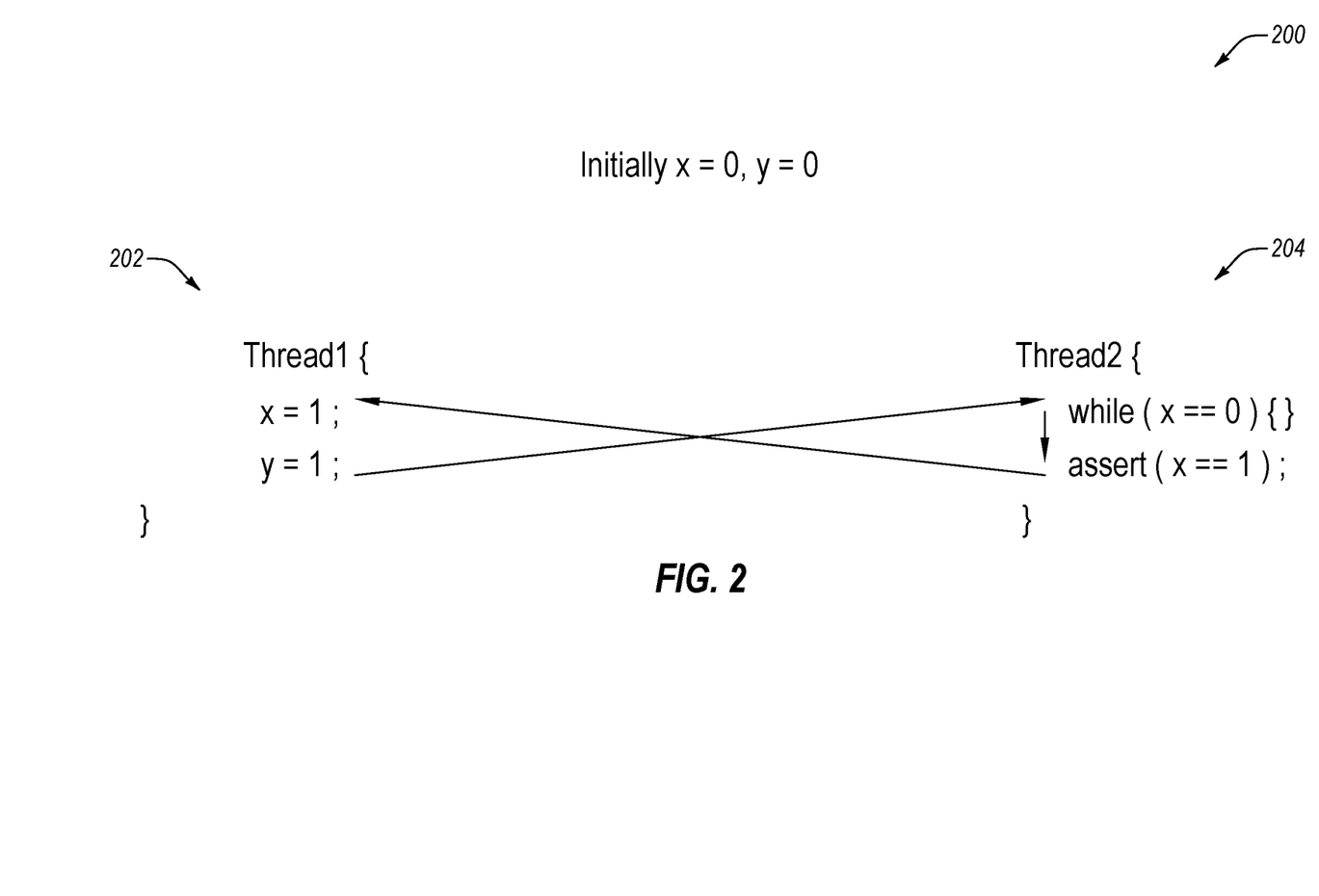
FIG. 2 illustrates source code for an example program including a plurality of threads.

For example, with reference to FIG. 2, source code 200 of an example program including two threads, thread 202 ("thread1") and thread 204 ("thread2"), is depicted. For example, WMM may optimize the program for performance (e.g., y=1 may be executed before x=1). One potential race under WWM that may occur is y=1, x=0.

American Fuzzy Lop (AFL) is a known fuzzing tool that uses algorithms to increase code coverage of test cases. For example, utilizing AFL to instrument a program, each basic block of the program may be given a unique identifier location. Further, a transition from a block A to a block B may be identified by "locationA^locationB" (e.g., XOR may be used as hashing). Moreover, according to various embodiments, a bitmap (e.g., an array of bits) may be used to identify which transitions are already explored. For example, a new bit in a bitmap may be indicative of identification (e.g., discovery and/or exploration) of a new transition in a test case. Further, via, for example, a genetic algorithm, a set of test cases (e.g., a population) may be mutated. In at least some embodiments, test cases that discover new transitions may be prioritized to be mutated. AFL may be considered efficient for a deterministic program, and quickly generate input (test case) to exercises different program paths. However, AFL may not discover concurrency bugs since it may not control the scheduler or the environment.

According to various embodiments of the present disclosure, an algorithm may include preprocessing wherein all READ and WRITE operations to shared memory may be identified (e.g., instruments all READ and WRITE access to shared memory).

Further, the algorithm may include generating (e.g., via a greybox fuzzer) inputs to explore different branches a program. For example, in some embodiments, branches of a program that have statements in a set of racing pairs may be of particular interest (e.g., focused on). More specifically, in some embodiments, branches of a program that have statements in a set of racing pairs may be analyzed to determine if an associated test case is a priority test case.

For example, the greybox fuzzer may be configured to focus on concurrency bugs. More specifically, according to some embodiments, two bitmaps may be used, wherein one bitmap (a "first bitmap") may be used for overall coverage (e.g., similar to AFL), and another bitmap (a "second bitmap") may be used for a set of racing pairs.

For example, pseudo-code to implement a tool (e.g., a fuzzer) may include:
cur_location=<COMPILE_TIME_RANDOM>;
shared_mem[cur_location^prev_location]++;
prev_location=cur_location>>1;
wherein current and previous locations include the locations of the READ and WRITE to the shared memory.

In addition, the algorithm may include selecting (e.g., via the greybox fuzzer) inputs and sending the inputs to a concurrency verification module (e.g., a model checker). According to some embodiments, when selecting inputs for mutation, inputs generating new traces in the second bitmaps may be selected first. Further, in at least some embodiments, only test inputs that generate unique coverage in the second bitmap may be sent to the concurrency verification module.

Further, the algorithm may include analyzing (e.g., via a concurrency verification module, such as a model checker or an active testing tool) each concrete input from the fuzzer with different scheduling policies to discover concurrency bugs.

Figure 3:
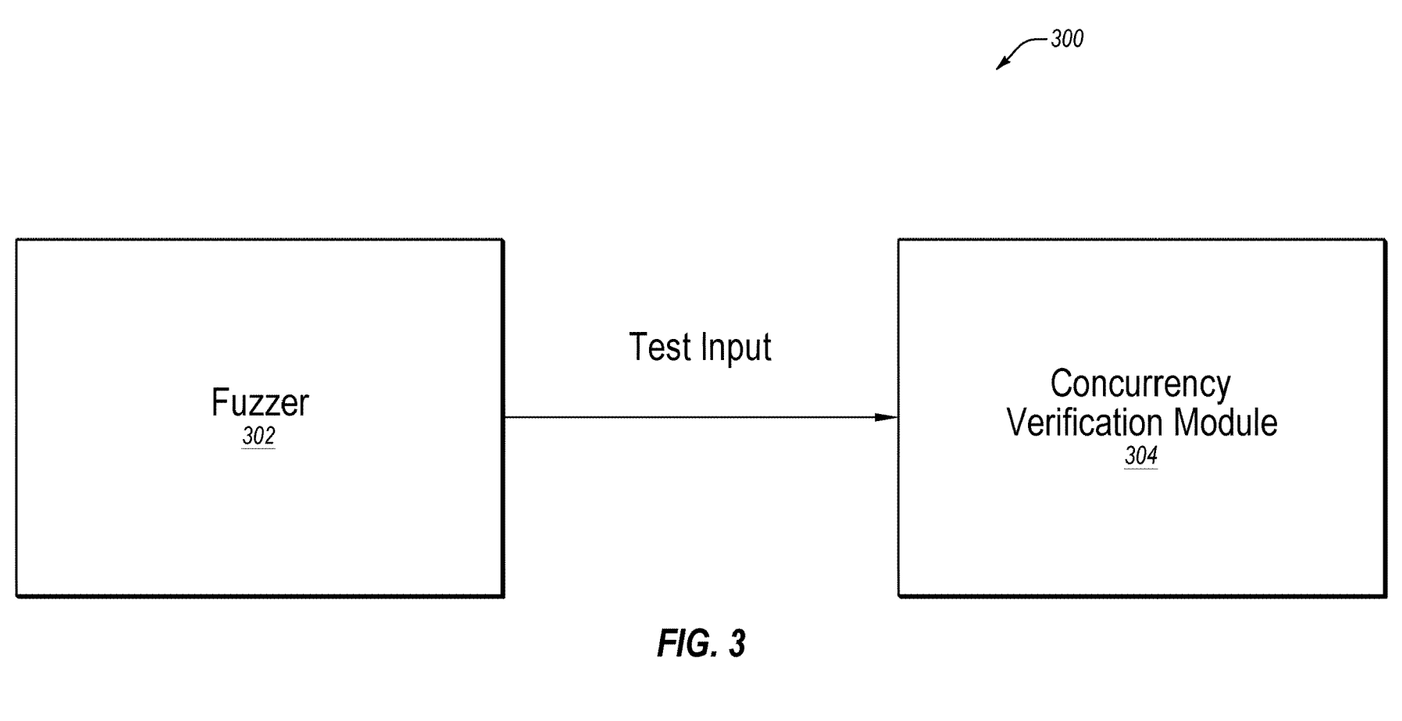
FIG. 3 depicts an example system including a greybox fuzzer and a concurrency verification module.

FIG. 3 illustrates an example system 300, in accordance with various embodiments of the present disclosure. System 300 includes a fuzzer 302, which may include a greybox fuzzer. More specifically, for example, fuzzer may include a race directed, coverage-guided greybox fuzzer. System 300 further includes a concurrency verification module 304 (also referred to herein as a "verification tool" or "testing device"), which may include a model checker and/or an active testing tool. For example, in an embodiment wherein concurrency verification module 304 includes a model checker, concurrency verification module 304 may include an explicit-state model checker.

During a contemplated operation of system 300, fuzzer 302 may generate (e.g., determine) inputs to explore different branches of a program. Further, fuzzer 302 may select inputs, and the inputs may be sent from fuzzer 302 to concurrency verification module 304. Moreover, concurrency verification module 304 may check each concrete input with different scheduling policies to discover concurrency bugs. Thus, according to various embodiments, system 300, and more specifically, fuzzer 302, may be configured to reduce a number of test cases provided to concurrency verification module 304.

Modifications, additions, or omissions may be made to system 300 without departing from the scope of the present disclosure. For example, system 300 may include two or more fuzzers 302 and/or two or more concurrency verification modules 304.

Figure 4:
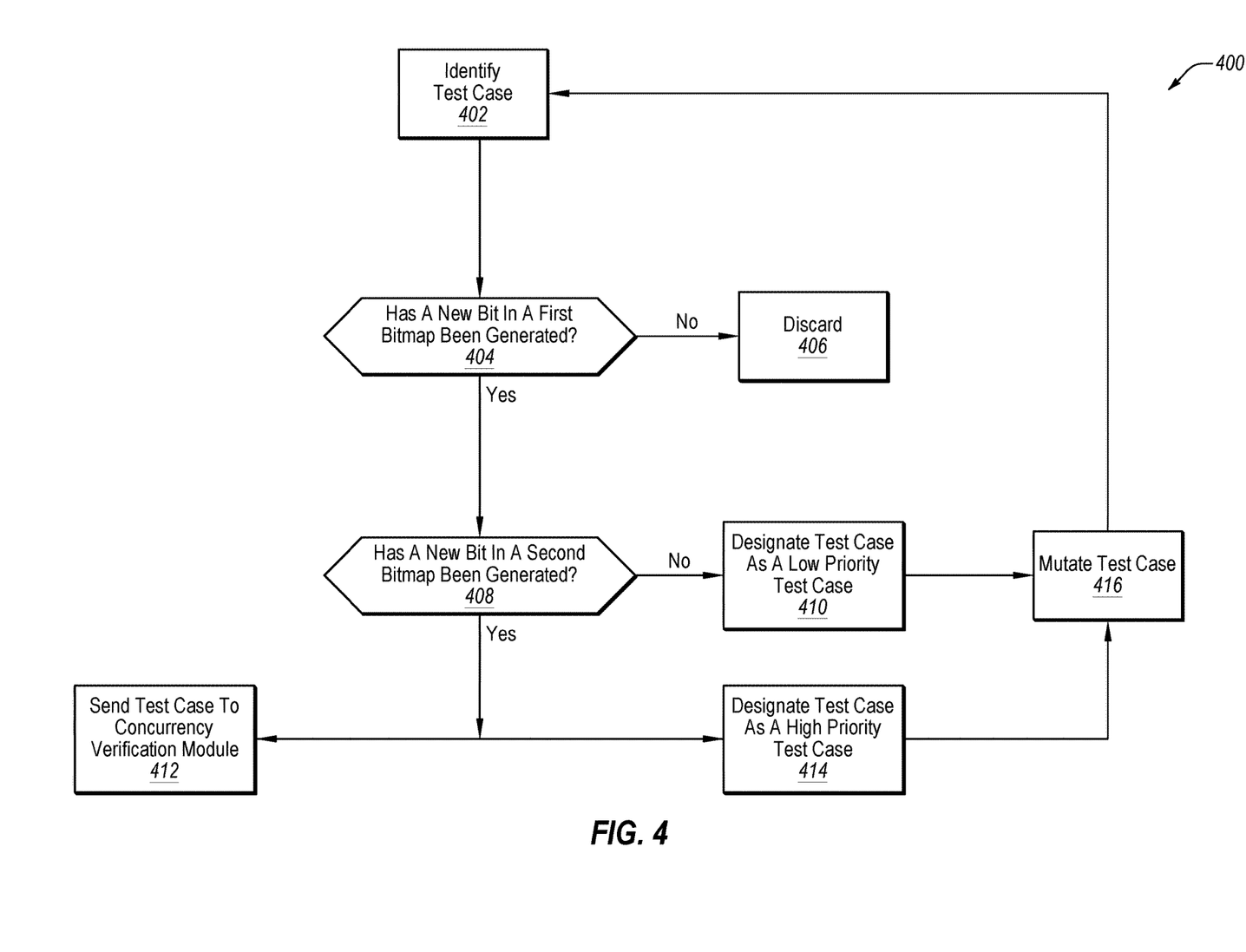
FIG. 4 depicts an example flow diagram of a method of performing greybox fuzzing.

FIG. 4 illustrates a flowchart of an example method 400 of performing fuzzing, in accordance with one or more embodiments of the present disclosure. In some embodiments, one or more of the operations associated with method 400 may be performed by system 300 of FIG. 1. More specifically, for example, method 400 may be performed by fuzzer 302 of system 300.

Alternately or additionally, method 400 may be performed by any suitable system, apparatus, or device. For example, processor 610 of system 600 (see FIG. 6) may perform one or more of the operations associated with method 400. Although illustrated with discrete blocks, the steps and operations associated with one or more of the blocks of method 400 may be divided into additional blocks, combined into fewer blocks, or eliminated, depending on the desired implementation.

At block 402, a test case may be identified, and method 400 may proceed to block 404. In some embodiments, a queue may include test cases, and test cases may be identified for testing based on priorities assigned to the test cases. Thus, in these embodiments, a test case having the highest priority in the queue may be identified for testing. For example, a test case may be determined (e.g., identified) via processor 610 of system 600 (see FIG. 6).

For example, in some embodiments including a seed test case, or test cases, a greybox fuzzer (e.g., fuzzer 302 of FIG. 3) may mutate inputs and selects a case, or cases, with high priority to be mutated again. According to some embodiments, the priority (e.g., high or low) may be determined by a fitness function.

Further, in at least some embodiments, based on the test case, two or more branches of a program that include sets of racing pairs may be analyzed (e.g., via a greybox fuzzer, such as fuzzer 302 of FIG. 3) to determine if the test case is a high priority test case (also referred to herein as a "priority test case") or a low priority test case. For example, the analysis may include determining whether or not each of a first bitmap and a second bitmap including a new bit, as described more fully below with reference to blocks 404 and 408.

For example, at block 404, a determination as to whether or not a new bit in a first bitmap has been generated. If a new bit in the first bitmap has not been generated, method 400 may proceed to block 406. If a new bit in the first bitmap has been generated, method 400 may proceed to block 408. In some embodiments, the first bitmap may include an AFL-type bitmap.

For example, a block 404, it may be determined, based on one bit (e.g., 0 or 1), whether or not a new condition has occurred (e.g., a new bit has been generated) in a race. More specifically, for example, a bitmap may record which one or more branches have been explored. Further, when, for example, a fuzzer (e.g., fuzzer 302 of FIG. 3) executes the program with a test input (or "test case" or "test vector") and records the trace, it may be determined whether the bitmap includes a new bit (e.g., a new branch has been discovered). A test case that discovers a new branch may be assigned a higher priority (e.g., to be mutated again). For example, processor 610 of system 600 (see FIG. 6) may determine whether or not a new bit in the first bitmap has been generated.

At block 406, the test case may be discarded. In some embodiments, method 400 may return to block 402 (e.g., after the test case is discarded).

At block 408, a determination as to whether or not a new bit in a second bitmap has be generated. If a new bit in the second bitmap has not been generated, method 400 may proceed to block 410. If a new bit in the second bitmap has been generated, method 400 may proceed to each of block 412 and block 414. For example, processor 610 of system 600 (see FIG. 6) may determine whether or not a new bit in the second bitmap has been generated.

For example, in at least some embodiments, the first bitmap may records one or more branches discovered (e.g., in an entire program). Further, the second bitmap may record the branches, in the same way, in the shared memory. When a test case discovers a new bit in the second bitmap (e.g., discovers a new branch in the shared memory), the test case may be of interest for discovering concurrency bugs. Since the test case is of interest, the test case may be sent to a model checker/active testing tool (e.g., at block 412) for further investigation on different scheduling policies. Further, the test case may be assigned a higher priority to be mutated (e.g., at block 414).

At block 410, the test case may be assigned a low priority, and method 400 may proceed to block 416. For example, the test case may be positioned at or near a bottom of a test case queue. For example, processor 610 of system 600 (see FIG. 6) may assign the test case a low priority.

At block 412, the test case may be sent to a concurrency verification module. For example, the test case may be sent to concurrency verification module 304 (see FIG. 3), which may include a model checker and/or an active testing tool.

At block 414, the test case may be assigned a high priority, and method 400 may proceed to block 416. For example, the test case may be positioned at or near a top of a test case queue. For example, processor 610 of system 600 (see FIG. 6) may assign the test case a high priority.

At block 416, the test case may be mutated, and method 400 may return to block 402. For example, processor 610 of system 600 (see FIG. 6) may mutate the test case.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in some embodiment, method 400 may include instrumenting for each read and write access for a program to shared memory.

Figure 5:
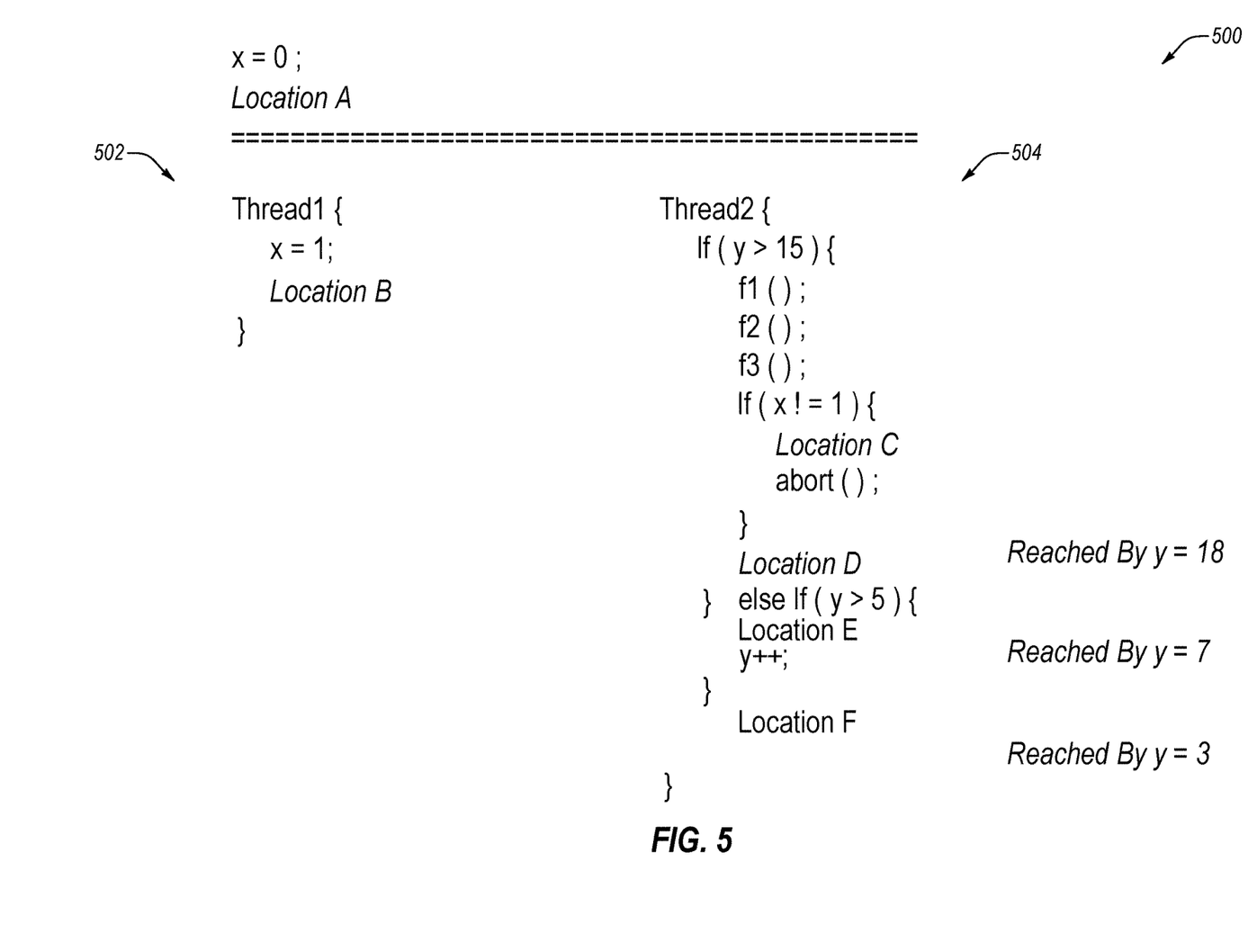
FIG. 5 illustrates source code of an example program including multiple threads and locations.

FIG. 5 depicts example source code 500 a program including two threads, thread 502 ("thread1") and thread 504 ("thread2"). For example, focusing on a second bitmap (e.g., for a set of racing pairs), in test cases $y=3$ or $y=7$, a flow proceeds from location A to location B. In this example, a new branch is discovered in a first bitmap, but not in the second bitmap. Stated another way, the first bitmap includes a new bit, but a second bitmap does not include a new bit. Accordingly, in this example, the test cases may not be of interest for race detection, and the test case may be given a low priority. However, as another example, wherein, for example, $y=18$, a flow proceeds from location A to location B, and from location B to location D. In this example, a new branch is generated in a first bitmap, and a new branch is generated in a second bitmap. Stated another way, the first bitmap includes a new bit, and the second bitmap includes a new bit. Accordingly, in this example, the test may be of interest for race detection, and the test case may be given a high priority. Further, the test case may be provided to a concurrency verification module (e.g., model checker and/or active testing tool), such as concurrency verification module 304 (see FIG. 3).

For example, execution for three inputs: $y=3$, 7, and 18 are now disclosed. For $y=3$, both $y>15$ and $y>5$ are false, and thus, the transition sequence is from location A to location B to location F. For $y=7$, $y>15$ is false, but $y>5$ is true. Thus, the transition sequence is from location A to location B to location E to location F. Accordingly, compared to the first bitmap, there two new bits that record the transitions from location B to location E, and from location E to location F. However, these transitions are not related to the shared memory, which includes only variable x in this example. Thus, there may not be new bit in the second bitmap. Therefore, the test case may not be sent to a concurrency verification module.

For $y=18$, $y>15$ is true, and a likely scheduling policy may give thread 1 and thread 2 equal priority. Thus, $x=1$ may be executed before the conditional statement if $(x!=1)$, and hence the condition is false. In this example, the transition sequence may be from location A to location B to location D to location F. This test case may not discover the bug (e.g., the abort statement may make the program crash, however it may be considered of interest as a new transition in the second bitmap (e.g., location B to location D) may be discovered. Thus, in this example, the test case may be sent to a concurrency verification module, which may discover the policy that makes $x!=1$ true, and hence the bug may be discovered.

Figure 6:
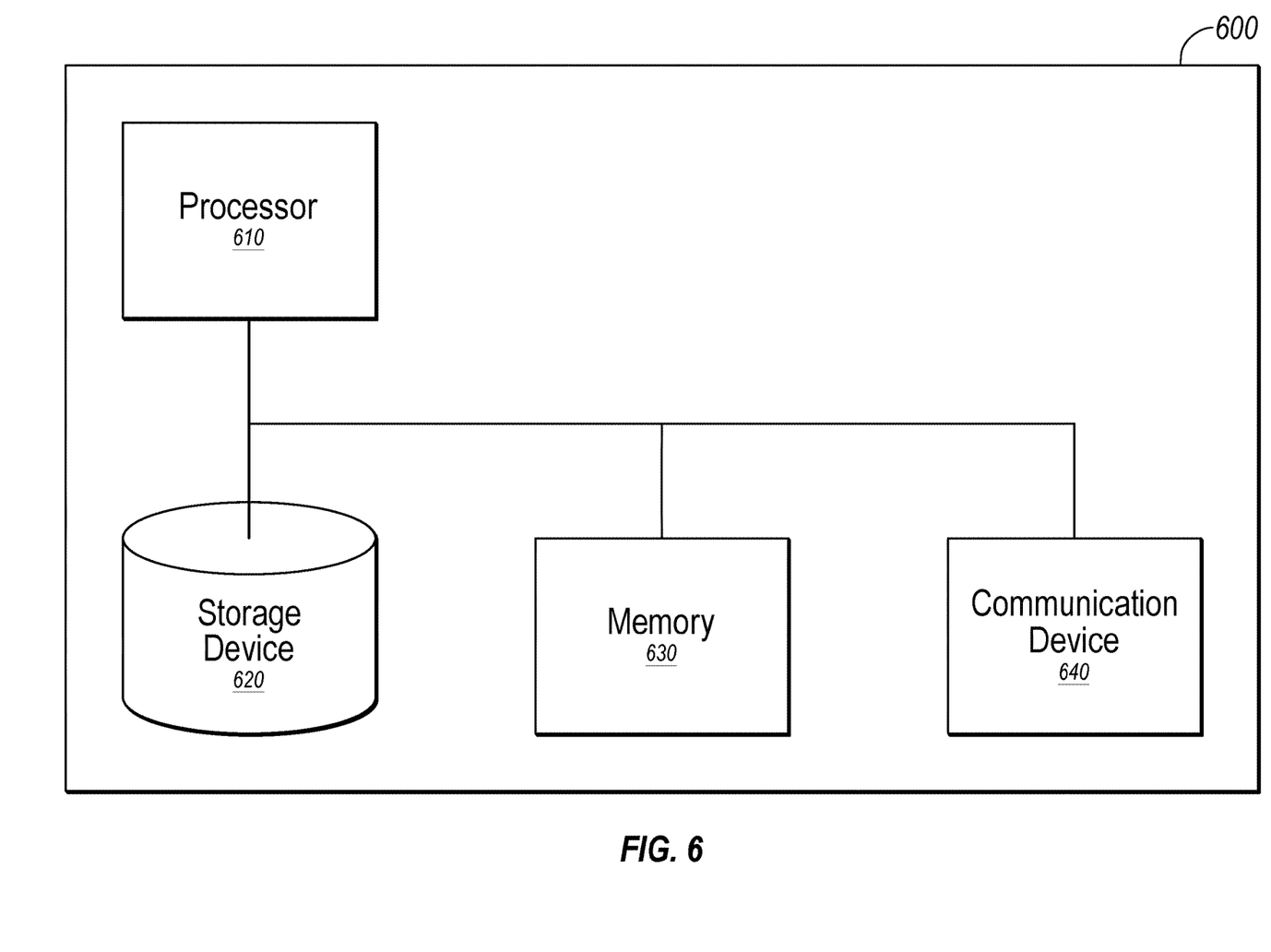
FIG. 6 is a block diagram of an example computing device.

FIG. 6 is a block diagram of an example computing device 600, in accordance with at least one embodiment of the present disclosure. Computing device 600 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 600 may include a processor 610, a storage device 620, a memory 630, and a communication device 640. Processor 610, storage device 620, memory 630, and/or communication device 640 may all be communicatively coupled such that each of the components may communicate with the other components. Computing device 600 may perform any of the operations described in the present disclosure.

In general, processor 610 may include any suitable special-purpose or general-purpose computer, computing entity, or processing device including various computer hardware or software modules and may be configured to execute instructions stored on any applicable computer-readable storage media. For example, processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, processor 610 may include any number of processors configured to perform, individually or collectively, any number of operations described in the present disclosure.

In some embodiments, processor 610 may interpret and/or execute program instructions and/or process data stored in storage device 620, memory 630, or storage device 620 and memory 630. In some embodiments, processor 610 may fetch program instructions from storage device 620 and load the program instructions in memory 630. After the program instructions are loaded into memory 630, processor 610 may execute the program instructions.

For example, in some embodiments one or more of processing operations for detecting concurrency vulnerabilities may be included in data storage 620 as program instructions. Processor 610 may fetch the program instructions of one or more of the processing operations and may load the program instructions of the processing operations in memory 630. After the program instructions of the processing operations are loaded into memory 630, processor 610 may execute the program instructions such that computing device 600 may implement the operations associated with the processing operations as directed by the program instructions.

Storage device 620 and memory 630 may include computer-readable storage media for carrying or having computer-executable instructions or data structures stored thereon. Such computer-readable storage media may include any available media that may be accessed by a general-purpose or special-purpose computer, such as processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

In some embodiments, storage device 620 and/or memory 630 may store data associated with concurrency vulnerability detection, and more specifically, data associated with source code, programs, inputs, bits, bitmaps, test input queues, etc.

Communication device 640 may include any device, system, component, or collection of components configured to allow or facilitate communication between computing device 600 and another electronic device. For example, communication device 640 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 640 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 6 without departing from the scope of the present disclosure. For example, computing device 600 may include more or fewer elements than those illustrated and described in the present disclosure. For example, computing device 600 may include an integrated display device such as a screen of a tablet or mobile phone or may include an external monitor, a projector, a television, or other suitable display device that may be separate from and communicatively coupled to computing device 600.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of identifying concurrency vulnerabilities, the method comprising:
   instrumenting read and write access for a program to a shared memory;
   identifying, via a greybox fuzzer, a test case for the program;
   analyzing, via the greybox fuzzer and based on the test case, two or more branches of the program that include sets of racing pairs to determine if the test case is a priority test case;
   in response to the test case being a priority test case, providing the test case from the greybox fuzzer to a concurrency verification module; and
   testing, via the concurrency verification module, the test case with one or more scheduling policies to identify one or more concurrency vulnerabilities.

2. The method of claim 1, wherein providing the test case to the concurrency verification module comprises providing the test case to one of a model checker and an active testing tool.

3. The method of claim 1, wherein analyzing the two or more branches of the program comprises:
   determining whether the test case generates new bits in each of a first bitmap and a second bitmap; and
   identifying the test case as a priority test case if the test case generates new bits in each of the first bitmap and the second bitmap.

4. The method of claim 1, wherein analyzing the two or more branches of the program comprises analyzing the two or more branches via a race directed, coverage guided greybox fuzzer.

5. The method of claim 1, wherein testing the test case with one or more scheduling policies to identify one or more concurrency vulnerabilities comprises testing the test case with one of a model checker and an active testing tool.

6. The method of claim 1, further comprising:
   in response to the test case being a priority test case, positioning the test case at or near a top of a test case priority queue.

7. The method of claim 1, further comprising:
   in response to the test case not being a priority test case:
      designating the test case as a low priority test case; and
      positioning the test case at or near a bottom of a test case priority queue.

8. One or more non-transitory computer-readable media that include instructions that, when executed by one or more processing systems, are configured to cause the one or more processing systems to perform operations, the operations comprising:
   instrumenting read and write access for a program to a shared memory;
   identifying, via a greybox fuzzer, a test case for the program;
   analyzing, via the greybox fuzzer and based on the test case, two or more branches of the program that include sets of racing pairs to determine if the test case is a priority test case;
   in response to the test case being a priority test case, providing the test case from the greybox fuzzer to a concurrency verification module; and
   testing, via the concurrency verification module, the test case with one or more scheduling policies to identify one or more concurrency vulnerabilities.

9. The computer-readable media of claim 8, wherein providing the test case to the concurrency verification module comprises providing the test case to one of a model checker and an active testing tool.

10. The computer-readable media of claim 8, wherein analyzing the two or more branches of the program comprises:
    determining whether the test case generates new bits in each of a first bitmap and a second bitmap; and
    identifying the test case as a priority test case if the test case generates new bits in each of the first bitmap and the second bitmap.

11. The computer-readable media of claim 8, wherein analyzing the two or more branches of the program comprises analyzing the two or more branches via a race directed, coverage guided greybox fuzzer.

12. The computer-readable media of claim 8, wherein testing the test case with one or more scheduling policies to identify one or more concurrency vulnerabilities comprises testing the test case with one of a model checker and an active testing tool.

13. The computer-readable media of claim 8, the operations further comprising:
    in response to the test case being a priority test case, positioning the test case at or near a top of a test case priority queue.

14. The computer-readable media of claim 8, the operations further comprising:
    in response to the test case not being a priority test case:
       designating the test case as a low priority test case; and
       positioning the test case at or near a bottom of a test case priority queue.

15. A system, comprising:
    one or more processing units configured to:

instrument read and write access for a program to a shared memory;

identify, via a greybox fuzzer, a test case for the program;

analyze, via the greybox fuzzer and based on the test case, two or more branches of the program that include sets of racing pairs to determine if the test case is a priority test case;

in response to the test case being a priority test case, provide the test case from the greybox fuzzer to a concurrency verification module; and test, via the concurrency verification module, the test case with one or more scheduling policies to identify one or more concurrency vulnerabilities.

16. The system of claim 15, wherein the concurrency verification module comprises one of a model checker and an active testing tool.

17. The system of claim 15, wherein to analyze the two or more branches of the program, the one or more processing units are configured to:

determine whether the test case generates new bits in each of a first bitmap and a second bitmap; and identify the test case as a priority test case if the test case generates new bits in each of the first bitmap and the second bitmap.

18. The system of claim 15, wherein the greybox fuzzer comprises a race directed, coverage guided greybox fuzzer.

19. The system of claim 15, wherein in response to the test case not being a priority test case, the one or more processing units are configured to position the test case at or near a bottom of a test case priority queue.

20. The system of claim 15, wherein in response to the test case being a priority test case, the one or more processing units are configured to position the test case at or near a top of a test case priority queue.

* * * * *